Dec. 10, 1968     W. C. THOMISON     3,415,959

ELECTRICAL SWITCHING DEVICE

Filed Dec. 5, 1966

INVENTOR.
William C. Thomison
BY Earl Q. Ayers
AGENT

United States Patent Office 3,415,959
Patented Dec. 10, 1968

3,415,959
ELECTRICAL SWITCHING DEVICE
William C. Thomison, Midland, Mich., assignor to The Dow Chemical Company, Midland, Mich., a corporation of Delaware
Filed Dec. 5, 1966, Ser. No. 598,987
6 Claims. (Cl. 200—61.08)

ABSTRACT OF THE DISCLOSURE

This invention relates to a device to be used as a means for triggering instruments recording phenomena associated with detonations triggered by a blasting cap, for example. The device consists of a metal case surrounding and insulated from a metal sleeve. The metal case is connected to the ground lead of a length of coaxial cable. The metal sleeve is connected to the center lead of the same length of cable. In use, the ground lead of the cable is connected to one terminal of a D.C. voltage source and the center lead connected to the opposite terminal of the same source. When the blasting cap detonates next to the contactor, it forces the metal case inward to make contact with the metal sleeve. This contact makes a complete electrical circuit. The resulting complete circuit can then be utilized to trigger recording instruments.

Background of the invention

This invention relates to electrical switching devices, and particularly to electrical switches which are actuated by the shock wave which occurs when a detonating device is fired.

It is desirable to be able to trigger the sweep circuits of an oscilloscope precisely as the detonation of an explosive material begins, in order that traces may be observed on the oscilloscope which are a function of the detonation velocity of the explosion, and which represent the arrival of a shock wave at predetermined distances from the explosion, for example.

Other switching devices are known for use in accomplishing such triggering of sweep circuits or other circuits associated with detonations.

Such devices are usually two wire leads embedded in chemical substances which, under the influence of the temperature or pressure occurring at the detonation of a detonating device, becomes conductive.

Relatively speaking, such prior art devices are expensive, require very substantial pressure (if that type device is used) to cause the chemical material to become conductive, or must be stored with care required of so-called explosive devices.

Accordingly, a principal object of this invention is to provide an improved pressure actuated electrical switching device for use in measuring detonation or other phenomena associated with explosions.

Another object of this invention is to provide an improved, more economical pressure actuated switching device for use in connection with the measuring of explosion phenomena.

A further object of this invention is to provide an improved, safer to handle and store electrical switching device for use in connection with the measuring of explosion phenomena.

Yet another object of this invention is to provide an improved, more reliable pressure actuated, fast acting, electrical switching device.

Summary of the invention

In accordance with this invention there is provided an electrical switching device to be used as a means for triggering instruments which record phenomena associated with detonations. It consists of a metal case surrounding and insulated from a metal sleeve. The metal case is connected to the ground lead (sheath) of a length of coaxial cable. The metal sleeve is connected to the center lead of the same length of cable. The switching device is usually disposed in lengthwise abutting relationship with respect to a detonator device such as a blasting cap. In use, the ground lead of the cable is connected to one terminal of a D.C. voltage source and the center lead connected to the opposite terminal of the same source. When the blasting cap detonates next to the contactor, the explosion forces the metal case of the device inward to make contact with the metal sleeve. This contact makes a complete electrical circuit. The resulting complete circuit can then be utilized to trigger recording instruments.

The problem was how to reliably trigger oscilloscopes, in the recording of traces from instrumented explosive phenomena, precisely as the detonation began. By placing a contactor next to the blasting cap initiating the explosion, it is possible to trigger the oscilloscope as the cap fires.

This same system can be used to detect the arrival of the shock wave anywhere in a large explosive charge.

Brief description of the drawing

The invention, as well as additional objects and advantages thereof, will best be understood when the following detailed description is read in connection with the accompanying drawing, in which.

Description of the preferred embodiment

Figure 1:
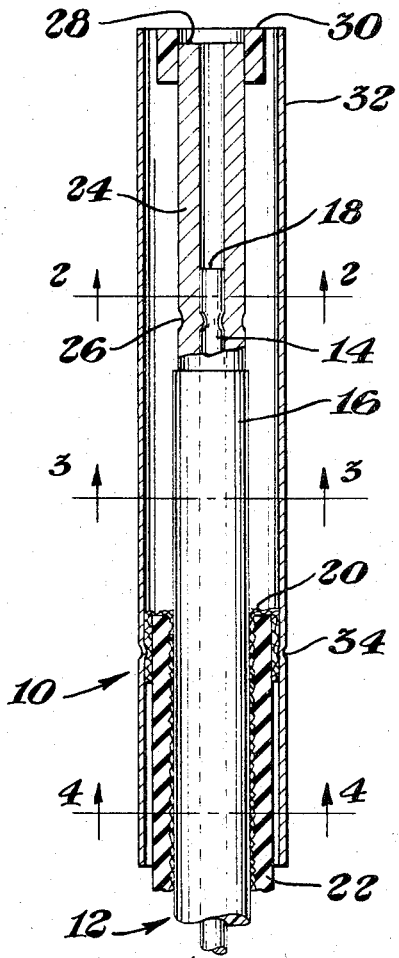
FIG. 1 is a side elevational view, partly in section, of a switching device in accordance with this invention.
Figure 2:
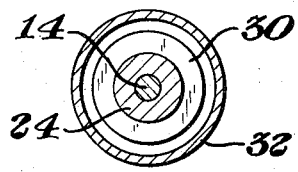
FIG. 2 is a sectional view taken along the line 2—2 of FIG. 1.
Figure 3:
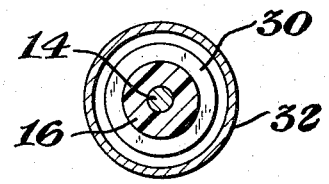
FIG. 3 is a sectional view taken along the line 3—3 of FIG. 1.
Figure 4:
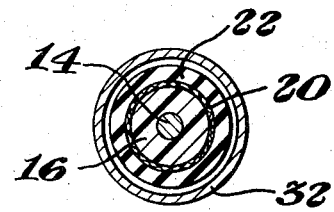
FIG. 4 is a sectional view taken along the line 4—4 of FIG. 1.

Referring to the drawing, and particularly to FIGS. 1–4, there is shown an electrical device, indicated generally by the numeral 10, comprising a length of coaxial cable 12 having an inner conductor 14 surrounded by insulating material 16 except near the end 18 of the conductor 14, the insulating material 16 in turn being surrounded by a metallic sheath 20 which is usually in woven form. The sheath 20 is, in turn, surrounded by a layer of insulating material 22. The outer layer of insulating material 22 is removed for predetermined distance back from the exposed inner conductor 14 and the exposed sheath is then folded back over the adjacent outer layer of insulation 22.

A metal sleeve 24 extends over the exposed or insulated part of the conductor 14 and is secured thereto, as by the crimp 26.

The rear end of the sleeve 24 abuts against the end of the insulating material 16. The forward end 28 of the sleeve 24 has a collar 30 of insulating material coupled thereon as by press fittings, for example.

A tubular metal outer casing 32 extends at least from the end 28 of the sleeve 24 to beyond the turned back part of the sheath 20. The inner diameter of the casing 32 is such that it fits easily over the turned back part of the sheath 20, with the casing being electrically coupled to the sheath and mechanically secured to the cable 12 by means of at least one crimp 34.

The insulating collar 30 prevents accidental contact between the casing 32 and sleeve 24 in event of normal mechanical movement of the elements 24 and 32.

Figure 5:
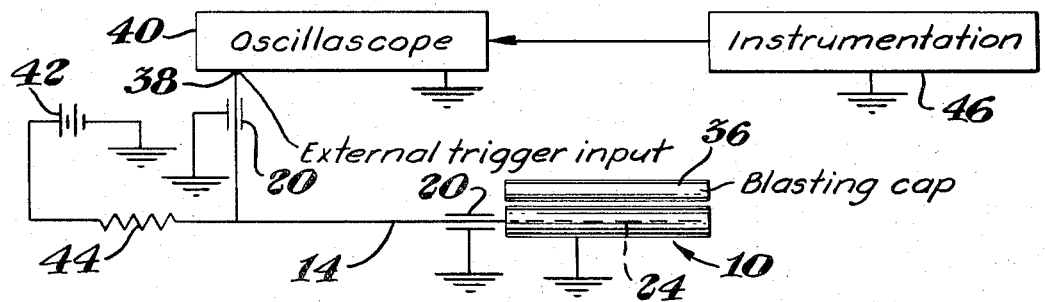
FIG. 5 is a simplified circuit showing the use of the device of this invention as used in a sweep triggering circuit which is coupled to an oscilloscope.

In operation, the switching device 10 is taped alongside of a blasting cap 36 or other detonator device (see FIG. 5). The inner conductor 16, coupled to the sleeve 24, is coupled to the sweep triggering input terminal 38 of an oscilloscope 40. The grounded sheath 20 is coupled to the ground terminal (directly or indirectly) of the oscilloscope 40, and the negative terminal of the battery or other source of electrical potential 42 is also grounded. A resistor 44, usually having a value of about 10,000 ohms, is coupled between the positive terminal of the battery 42 and the terminal 38 of the oscilloscope 40. For the sake of convenience in the diagram in FIG. 5, the connection from the resistor 44 to the terminal 38 is shown as though the resistor was coupled to the inner conductor 14 of the cable.

An instrumentation device 46 is coupled, through lead 48, to a deflection input circuit of the oscilloscope 40.

Thus, assuming the oscilloscope 38 is adjusted to respond to a negative external triggering potential, when the detonator device 36 is fired, the pressure on the adjacent (usually abutting) device 10 causes the casing 32 to collapse against the sleeve 24, thus shorting the inner conductor 14 to the outer conductor 20 of the cable 12.

When the inner and outer conductor are effectively shorted, the potential at the terminal 38 of the oscilloscope suddenly becomes more negative, triggering the sweep circuit of the oscilloscope 40, as is well known to those skilled in the art.

While a particular circuit utilizing the device 10 has been shown in FIG. 5, other circuits may be used.

As may readily be seen, switching devices of the type shown in FIG. 1 are economical to make, have no chemicals associated therewith which may change characteristics on aging, and may be handled and stored with safety without using special precautions. The device 10 is simple, yet reliable in operation.

What is claimed is:
1. Electrical switching apparatus adapted for use in conjunction with a detonator device whereby said device is short circuited as a detonation occurs, comprising
    (A) a length of coaxial cable having an inner conductor, a first layer of insulating material, said first layer of insulating material surrounding said inner conductor, a sleeve-like outer conductor, said outer conductor fitting closely over said first layer of insulating material, a short length of said inner conductor extending beyond said first layer of insulating material, and said outer conductor being removed from over said first layer of insulating material for a short distance away from said short length of inner conductor extending from said first layer of insulating material,
    (B) a tubular electrically conductive sleeve, said sleeve being electrically coupled to said short length of inner conductor, and
    (C) a tubular electrically conductive casing, said casing being of substantially larger inner diameter and longer than said sleeve, said casing being disposed over and spaced from said sleeve and extending over said outer conductor, said casing being mechanically and electrically secured to said outer conductor.

2. Apparatus in accordance with claim 1, wherein an insulating collar is disposed over said sleeve at its end which is remote from said first layer of insulating material.

3. Apparatus in accordance with claim 1, wherein said cable has a second layer of insulating material, and said second layer is disposed in close fitting relationship over said outer conductor.

4. Apparatus in accordance with claim 1, wherein said outer conductor is a woven metal sleeve.

5. Apparatus in accordance with claim 1, wherein said casing has thin metal walls.

6. Apparatus in accordance with claim 1, wherein said outer conductor is folded back over itself and said casing is secured to said cable at said folded back part.

References Cited

UNITED STATES PATENTS

| | | | |
|---|---|---|---|
| 2,932,708 | 4/1960 | Jensen | 200—142 |
| 3,180,957 | 4/1965 | Chumakov | 200—142 |

ROBERT K. SCHAEFER, *Primary Examiner.*

H. O. JONES, *Assistant Examiner.*

U.S. Cl. X.R.

200—142